(12) United States Patent
Sakurai et al.

(10) Patent No.: US 12,371,149 B2
(45) Date of Patent: Jul. 29, 2025

(54) MULTI-FUNCTIONAL TRAILING EDGE APPARATUS AND METHODS FOR AIRCRAFT

(71) Applicant: The Boeing Company, Arlington, VA (US)

(72) Inventors: Seiya Sakurai, Langley, WA (US); Samuel Lewis Block, Bothell, WA (US); Bret Alan Bowers, Langley, WA (US); Bryan Jacob Gruner, Bellevue, WA (US)

(73) Assignee: The Boeing Company, Arlington, VA (US)

( * ) Notice: Subject to any disclaimer, the term of this patent is extended or adjusted under 35 U.S.C. 154(b) by 0 days.

(21) Appl. No.: 18/463,146

(22) Filed: Sep. 7, 2023

(65) Prior Publication Data

US 2025/0083796 A1  Mar. 13, 2025

(51) Int. Cl.
  *B64C 9/20* (2006.01)
  *B64C 13/50* (2006.01)
  *B64C 9/06* (2006.01)

(52) U.S. Cl.
  CPC .......... *B64C 9/20* (2013.01); *B64C 9/06* (2013.01); *B64C 13/50* (2013.01)

(58) Field of Classification Search
  CPC .... B64C 9/06; B64C 9/18; B64C 9/20; B64C 13/50
  See application file for complete search history.

(56) References Cited

U.S. PATENT DOCUMENTS

| | | |
|---|---|---|
| 7,243,881 B2 | 7/2007 | Sakurai et al. |
| 7,258,308 B2 * | 8/2007 | Beyer ................. B64C 9/18 244/215 |
| 10,017,243 B2 * | 7/2018 | Moser ................ B64C 13/34 |
| 11,427,301 B2 * | 8/2022 | Tsai .................. B64C 13/30 |
| 11,858,629 B2 * | 1/2024 | Foskey ................ B64C 9/16 |

* cited by examiner

*Primary Examiner* — Brian M O'Hara
(74) *Attorney, Agent, or Firm* — Hanley, Flight & Zimmerman, LLC

(57) ABSTRACT

Multi-functional trailing edge apparatus and methods for aircraft are disclosed herein. An example wing of an aircraft disclosed herein includes an aft edge supporting a trailing edge device. The trailing edge device has a control surface and a side surface. A linkage is rotatably coupled to the side surface and the aft edge, and a rotary actuator is operatively coupled to the linkage to move the control surface.

23 Claims, 11 Drawing Sheets

MULTI-FUNCTIONAL TRAILING EDGE APPARATUS AND METHODS FOR AIRCRAFT

FIELD OF THE DISCLOSURE

This disclosure relates generally to aircraft and, more particularly, to multi-functional trailing edge apparatus and methods for aircraft.

BACKGROUND

Many fixed wing aircraft use devices to alter the aerodynamic properties of the wings of the aircraft. Many aircraft utilize a variety of edge devices on the wings, each to provide a different change in wing performance. Trailing edge devices (i.e., devices found on the aft edge of a wing) serve as control surfaces to change the flight direction, orientation, and lift characteristics of the aircraft. Flaps, spoilers, and ailerons are well-known and widely used trailing edge devices. To house this variety of edge devices, aircraft wings must be designed to accommodate the unique size, shape, and actuation system of each trailing edge device.

SUMMARY

An example wing of an aircraft disclosed herein includes an aft edge supporting a trailing edge device. The trailing edge device has a control surface and a side surface (e.g., a wall, a close-out rib, a close-out panel, etc.). A linkage is rotatably coupled to the side surface and the aft edge, and a rotary actuator is operatively coupled to the linkage to move the control surface.

An example trailing edge device disclosed herein includes a body having a first side surface. The trailing edge device has a first plurality of link bars rotatably coupled to the first side surface. A first actuator is operatively coupled to a first link bar of the first plurality of link bars, and the actuator rotates the first link bar relative to the body.

An example method for assembling a trailing edge system disclosed herein includes coupling a first side of a first trailing edge device to a first mounting point on an airfoil. The first trailing edge device includes a plurality of linkage members rotatably coupled to the first side of the first trailing edge device, a rotational actuator inside the first trailing edge device, the rotational actuator coupled to a first linkage member of the plurality of linkage members, and a second plurality of linkage members rotatably coupled to a second side of the first trailing edge device. The example method also includes coupling the second side of the first trailing edge device to a second mounting point on the airfoil.

Figure 1:
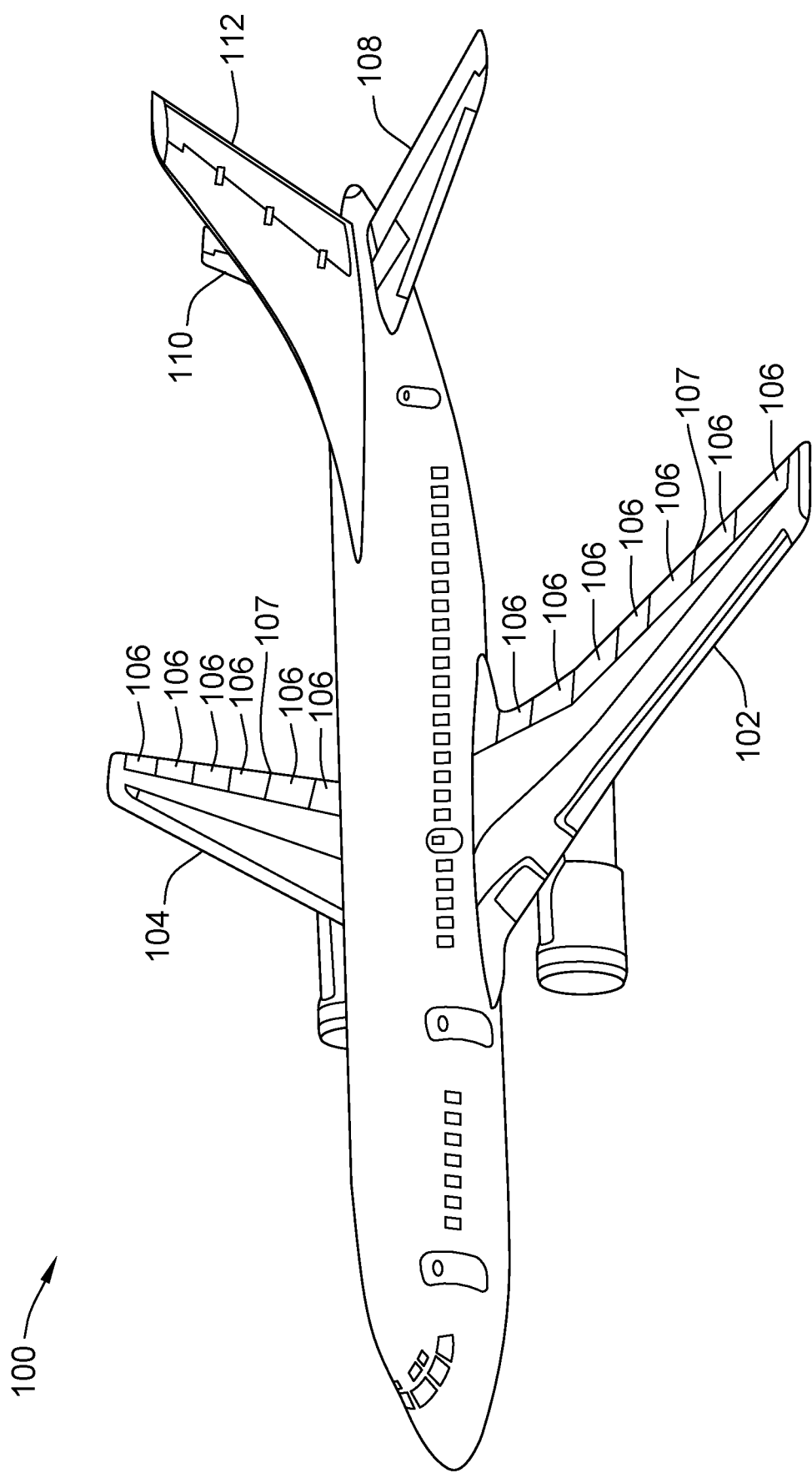
FIG. 1 illustrates an example aircraft in which example trailing edge devices disclosed herein can be implemented.

In general, the same reference numbers will be used throughout the drawing(s) and accompanying written description to refer to the same or like parts. The figures are not necessarily to scale. Instead, the thickness of the layers or regions can be enlarged in the drawings. Although the figures show layers and regions with clean lines and boundaries, some or all of these lines and/or boundaries can be idealized. In reality, the boundaries and/or lines can be unobservable, blended, and/or irregular.

As used herein, unless otherwise stated, the term "above" describes the relationship of two parts relative to Earth. A first part is above a second part, if the second part has at least one part between Earth and the first part. Likewise, as used herein, a first part is "below" a second part when the first part is closer to the Earth than the second part. As noted above, a first part can be above or below a second part with one or more of: other parts therebetween, without other parts therebetween, with the first and second parts touching, or without the first and second parts being in direct contact with one another.

As used in this patent, stating that any part (e.g., a layer, film, area, region, or plate) is in any way on (e.g., positioned on, located on, disposed on, or formed on, etc.) another part, indicates that the referenced part is either in contact with the other part, or that the referenced part is above the other part with one or more intermediate part(s) located therebetween.

As used herein, connection references (e.g., attached, coupled, connected, and joined) can include intermediate members between the elements referenced by the connection reference and/or relative movement between those elements unless otherwise indicated. As such, connection references do not necessarily infer that two elements are directly connected and/or in fixed relation to each other. As used herein, stating that any part is in "contact" with another part is defined to mean that there is no intermediate part between the two parts.

Unless specifically stated otherwise, descriptors such as "first," "second," "third," etc., are used herein without imputing or otherwise indicating any meaning of priority, physical order, arrangement in a list, and/or ordering in any way, but are merely used as labels and/or arbitrary names to distinguish elements for ease of understanding the disclosed examples. In some examples, the descriptor "first" can be used to refer to an element in the detailed description, while the same element can be referred to in a claim with a different descriptor such as "second" or "third." In such instances, it should be understood that such descriptors are used merely for identifying those elements distinctly within the context of the discussion (e.g., within a claim) in which the elements might, for example, otherwise share a same name.

As used herein, "approximately" and "about" modify their subjects/values to recognize the potential presence of variations that occur in real world applications. For example, "approximately" and "about" can modify dimensions that may not be exact due to manufacturing tolerances and/or other real world imperfections as will be understood by persons of ordinary skill in the art. For example, "approximately" and "about" can indicate such dimensions can be within a tolerance range of +/−10% unless otherwise specified in the below description.

DETAILED DESCRIPTION

Disclosed herein are trailing edge apparatus and methods that include an actuation mechanism that enables a trailing edge device of an aircraft to move through a wider range of motion than many known trailing edge devices, thereby enabling the trailing edge devices described herein to provide multiple functions. The trailing edge devices described herein can, for example, move a control surface between a raised position, a neutral position, and a lowered position. In some examples, a control surface defined by trailing edge devices disclosed herein can move between a raised position and a lowered position at high speed (e.g., approximately 60 degree rotation per second). In some examples, a single trailing edge device disclosed herein can be used as a spoiler, an aileron, a flap, and a flaperon, and/or a similar multi-functional control surface(s).

Many known control surfaces are actuated by multiple actuators, typically a series of linear actuators such as hydraulic pistons, operatively coupled via complex linkages to define the motions of the actuators and the resulting motion of the control surface coupled to the linkages. This often results in a heavy system that requires a large amount of space in and around the wing of an aircraft. Thus, many known trailing edge devices limit the design of aircraft wings and can additionally necessitate the use of large fairing surfaces to minimize drag on the wing.

The example trailing edge apparatus disclosed herein include an actuation system contained within a cavity or space defined by a body of the trailing edge apparatus. In some examples, trailing edge apparatus disclosed herein do not use multiple linear actuators (e.g., hydraulic pistons), but rather a single rotary actuator (e.g., electric, pneumatic, or hydraulic motor). Some example trailing edge apparatus disclosed herein employ a plurality of rotary actuators to move the trailing edge apparatus through a range of motion. Contrary to known trailing edge apparatus which house an actuation system in a cavity of a wing of an aircraft, example trailing edge apparatus disclosed herein include an actuation system contained or housed within a cavity of the trailing edge apparatus. Thus, actuation components of the trailing edge apparatus disclosed herein consume a substantially reduced amount of volume within an aircraft wing, unlike the above-noted known systems that employ linear actuators such as hydraulic pistons, which require a wing space volume that accommodates the full range of piston motion.

Further, the rotary actuators used with the trailing edge devices described herein are directly coupled to a linkage (e.g., rotate the linkage directly), which reduces the mechanical advantage required to manage the torque loads and allows for a smaller, lower-powered actuator to be used. In some examples, this allows the rotary actuator to reside entirely inside the trailing edge device, thereby substantially reducing the space required in/on the aircraft wing. This reduced space requirement enables the aircraft wing to be designed to more easily meet reduced cost and increased performance goals.

The example trailing edge apparatus and methods disclosed herein allow for multiple trailing edge devices to be arranged along the aft edge of an aircraft wing. In some examples, the trailing edge devices abut to provide a continuous or substantially continuous control surface along the wing. In some examples, multiple trailing edge devices are grouped together to form a single larger control surface. This simplifies the aircraft manufacturing process, as multiple differently designed control surfaces are replaced by substantially similar or identical devices. Further, such a continuous or substantially continuous control surface allows for more flexibility in aircraft control, including selectively deploying sections of the control surface (e.g., thrust gating). Example wings with a plurality of trailing edge devices disclosed herein have trailing edge devices with shorter spans than known wings, which lessens or eliminates the risk of wing flutter.

Example trailing edge apparatus and methods disclosed herein include actuation mechanisms that are housed or contained entirely within (e.g., a cavity of) the trailing edge device, which enables a modular approach to manufacturing trailing edge systems. The example trailing edge devices described herein can be manufactured separately in large numbers and then later attached to an aircraft wing. The linkage of one example trailing edge device allows the trailing edge device to be installed by coupling four separate points to ribs in the wing, thereby simplifying assembly of trailing edge systems and lowering costs for the manufacturer.

Example trailing edge apparatus and methods disclosed herein are illustrated in connection with the wing of an aircraft. However, the modular design of the trailing edge devices described herein allows these devices to be used on any airfoil on the aircraft where space and weight may be design concerns. Additionally, example trailing edge apparatus and methods disclosed herein are illustrated with a rotary actuator. However, in some examples, an example trailing edge apparatus disclosed herein can include a plurality of rotary actuators, a linear actuator, a plurality of linear actuators, a combination of linear and/or linear actuators, and/or any other suitable actuator(s).

FIG. 1 illustrates an example aircraft 100 in which example trailing edge devices described herein can be implemented in accordance with the teachings of this disclosure. While the aircraft 100 illustrates a common commercial aircraft, the trailing edge devices described herein can be adapted to any number of different types of aircraft (e.g., winged aircraft, rotorcraft, etc.). The aircraft 100 of FIG. 1 includes an example first wing 102 and an example second wing 104. The first wing 102 and the second wing 104 each include at least one example trailing edge device 106 on an aft edge 107 (i.e., a trailing edge) of the respective wing. As control surface requirements can vary based on an overall design of an aircraft, the exact size and number of trailing edge devices can vary from that shown in connection with the example wings 102 and 104 of FIG. 1. For example, the trailing edge devices described herein can be adapted to meet the particular control requirements of any airfoil surface, such as horizontal stabilizers 108 and 110 or a vertical stabilizer 112 of the example aircraft 100 in FIG. 1.

Figure 2:
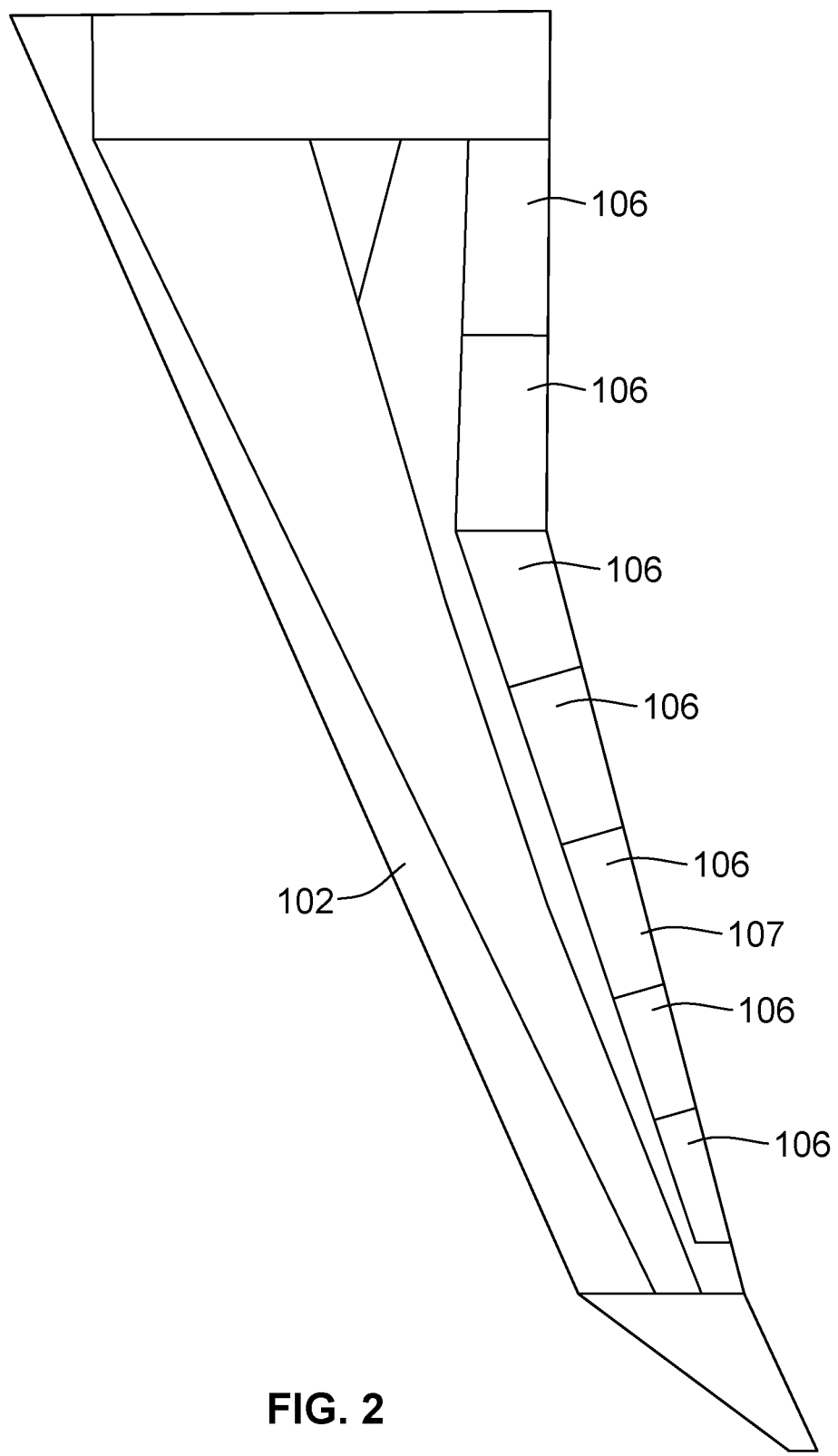
FIG. 2 illustrates a top view of the first example wing of the example aircraft in FIG. 1 with a plurality of example trailing edge devices.

FIG. 2 illustrates a top view of the example first wing 102 of the example aircraft 100 in FIG. 1. As shown in FIG. 2, seven trailing edge devices 106 are present on the aft edge 107 of the first wing 102. However, a single trailing edge device 106 or any number of trailing edge devices 106 (e.g., two trailing edge devices 106, four trailing edge devices 106, eight trailing edge devices 106, etc.) can be utilized to meet the control surface needs of the first wing 102. The number, size, and/or orientation of the trailing edge devices 106 depends on the particular geometry of the aircraft wing. Trailing edge devices 106 can be identically sized on the wing 102, or they can differ in shape and/or dimensions from what is depicted herein. In some examples, the plurality of trailing edge devices 106 can operate collectively (e.g., in unison) to provide a single larger control surface. In some examples, the plurality of trailing edge devices 106 can operate independently of each other to provide a plurality of discrete or independent control surfaces along the aft edge 107 of the wing 102.

Figure 3A:
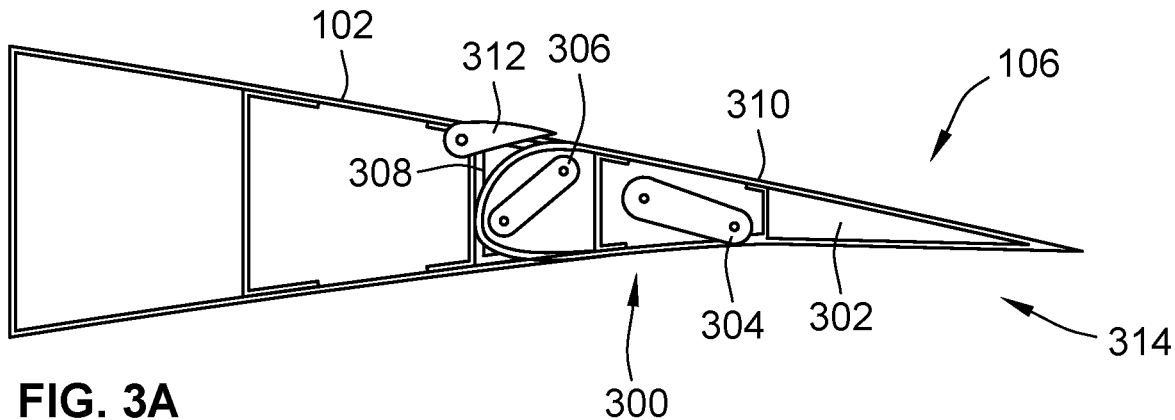
FIGS. 3A-3C are cross-sectional views of an example trailing edge device and linkage, the example linkage controlling the trailing edge device movement through an example neutral position, lowered position, and raised position.
Figure 3B:
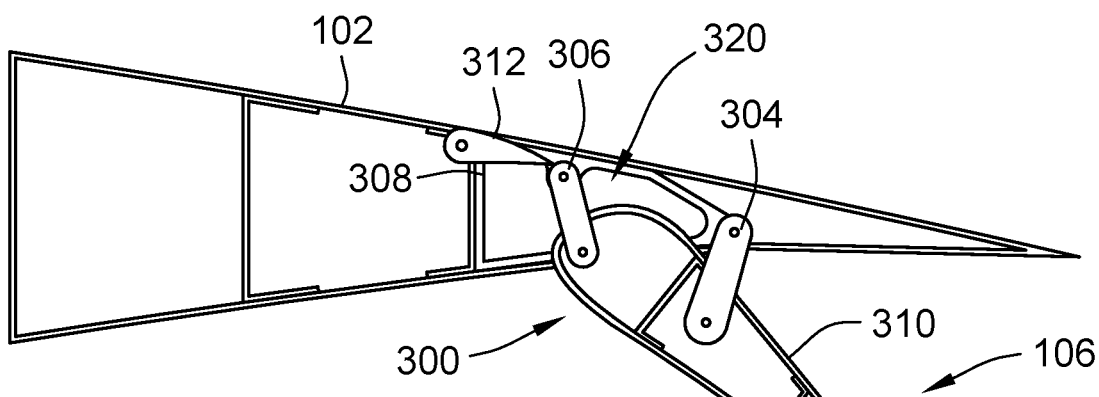
Figure 3C:
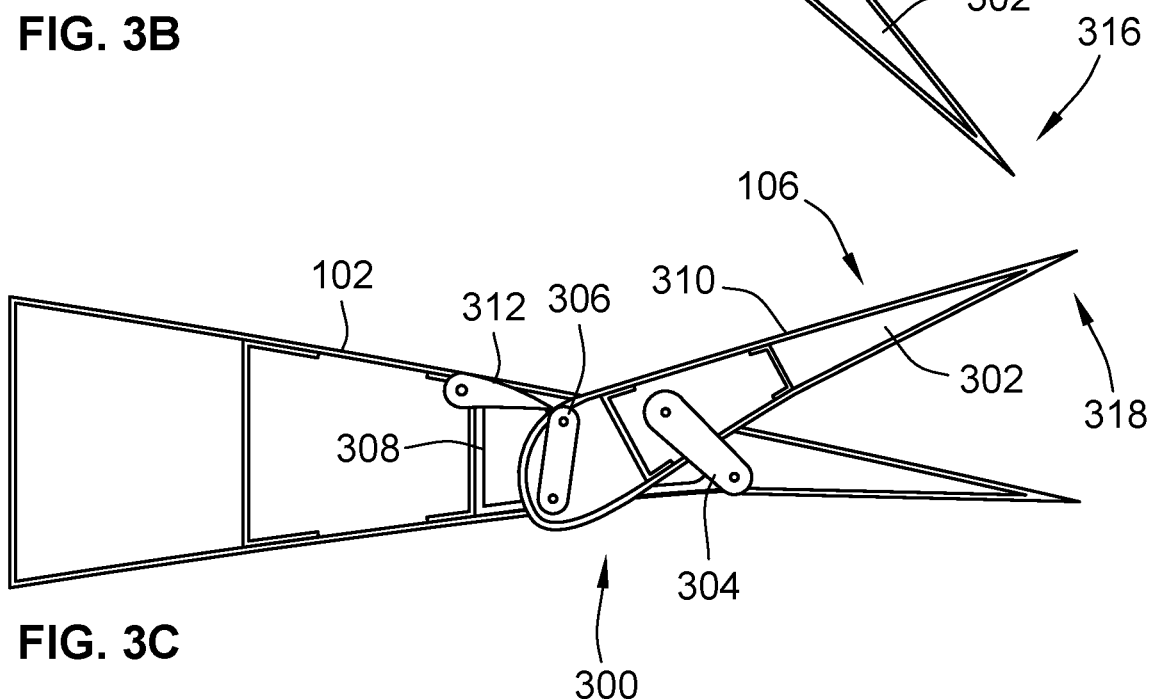

FIGS. 3A-3C are cross-sectional side views of an example trailing edge device 106 of the first wing 102. FIG. 3A shows the example trailing edge device 106 in an example neutral position 314. FIG. 3B shows the example trailing edge device 106 in an example lowered position 316 (e.g., a high-lift position). FIG. 3C shows the example trailing edge device 106 in an example raised position 318 (e.g., a spoiler position). These positions constitute a wide range of motion relative to known trailing edge devices and enable the trailing edge device 106 to provide multiple functions. The section view of wing 102 and the trailing edge device 106 shows an example internal structure, but this internal structure can be any known structure that meets the mechanical performance needs of the wing 102 and the trailing edge device 106.

To move the trailing edge device 106 between the neutral position 314, the lowered position 316, and the raised position 318, the example trailing edge device 106 includes an actuator system including an example coupling or linkage 300. In this example, the linkage 300 includes a body 302 coupled to a first link bar 304 and a second link bar 306. The example body 302 of the trailing edge device 106 as shown in FIGS. 3A-3C has an example control surface 310 and, thus, the body 302 can be employed for use as a flap, an aileron, a spoiler, an elevator, a rudder, a flaperon or any other combined control surface. An example mounting bracket 308 provides a mounting point on the wing 102 for the trailing edge device 106. In some examples, the mounting bracket 308 is an extension of a rib of the wing 102 or other suitable load bearing structure (e.g., wing box, spar, strut). In other examples, the mounting bracket 308 is a separate bracket coupled to a load bearing structure within the wing 102 (e.g., airfoil). The first link bar 304 and the second link bar 306 of the illustrated example are flat-shaped links or plates. However, in some examples, the first link bar 304 and the second link bar 306 can be implemented to have any rigid shape that can be rotationally coupled to the body 302 and the mounting bracket 308.

The example linkage 300 as illustrated in FIGS. 3A-3C is a four-bar linkage. The mounting bracket 308 forms a ground link (i.e., a stationary link) of the four-bar linkage, the second link bar 306 forms a rocker link of the four-bar linkage, the body 302 forms a coupler link of the four-bar linkage, and the first link bar 304 forms the crank link (i.e., an actuated link). Thus, the first link bar 304 is actuated (e.g., rotated) to move the body 302 relative to the mounting bracket 308. This adjusts an angle of the body 302 and/or the control surface 310 relative to a surface of the wing 102 to alter the aerodynamics of the example wing 102 (i.e., airfoil).

FIGS. 3A-3C show that the example trailing edge device 106 can in some examples include a panel 312 at least partially above the trailing edge device 106. The panel 312 is rotationally biased to contact the body 302 of the trailing edge device 106, thus covering any gap that can interfere with or alter the aerodynamics of the example wing 102 (i.e., airfoil). The panel 312 can be rotationally biased toward the body 302 via a biasing element including, but not limited to, a torsion spring, compression spring, piston, a combination thereof, and/or any other known biasing device or method.

FIG. 3B shows that, in some example trailing edge devices, the linkage 300 translates the body 302 away from the wing 102 while rotating the body 302 to the lowered position 316 (e.g., in a downward direction relative to the wing 102 in the orientation of FIG. 3B). This compound motion of the body 302 causes the panel 312 to move toward (e.g., contact) the second link bar 306 as the body 302 rotates toward the lowered position 316 and the biasing element causes the panel 312 to rotate towards the body 302. The panel 312 of the example trailing edge device 106 is sized to leave a gap 320 (shown more clearly in FIG. 7) between the panel 312 and the body 302. Thus, the lowered position 316 of the trailing edge device 106 can be adapted to be an aerodynamically advantageous high-lift position by adapting the gap 320 between the panel 312 and the body 302.

FIG. 3C shows that, in some example trailing edge devices, the linkage 300 translates the body 302 away from the wing 102 while rotating the body 302 to the raised position 318 (e.g., in an upward direction relative to the wing 102 in the orientation of FIG. 3C). This compound motion of the body 302 causes the panel 312 to move with the body 302 as the body 302 rotates toward the raised position 318. In this example, the body 302 engages the panel 312 and causes rotation of the panel 312 against the force of the biasing element of the panel 312. In this manner, the panel 312 engages (e.g., directly contacts) the body 302 when the body 302 moves toward the raised position 318.

Figure 4:
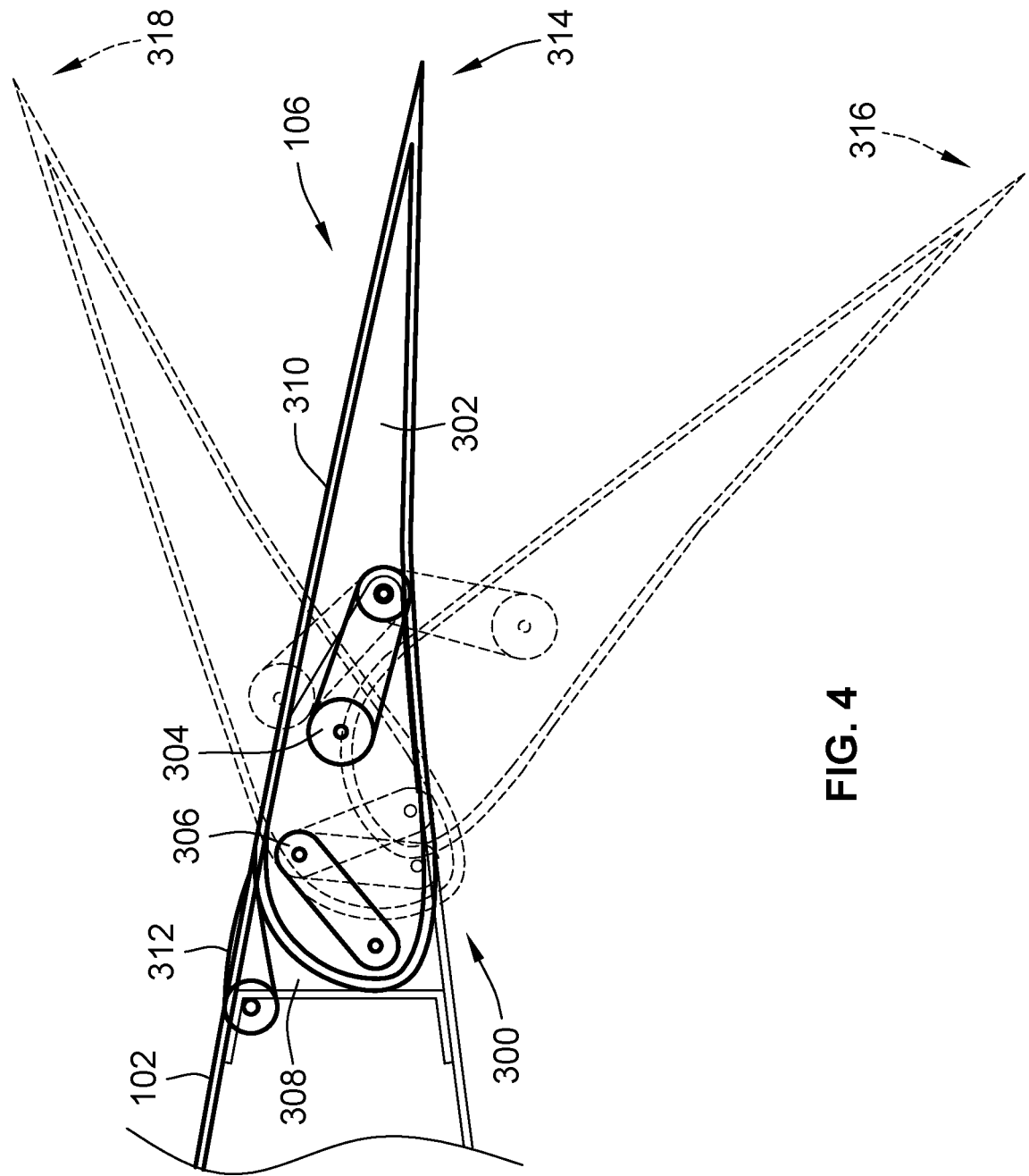
FIG. 4 illustrates an example range of motion of example linkage members and example corresponding range of motion of the example trailing edge device of FIGS. 3A-3C.

FIG. 4 illustrates an example range of motion of the example linkage 300 and the corresponding range of motion of the example trailing edge device 106 of FIGS. 3A-3C. The first link bar 304 and the second link bar 306 rotate relative to the example mounting bracket 308 as the example body 302 moves between the lowered position 316 and the raised position 318. The range of motion shown in FIG. 4 includes any intermediate position or angle between the raised position 318 and the lowered position 316. The first link bar 304 and second link bar 306 have ranges of motion that do not extend substantially outside of the body 302 or the surface of example wing 102. Many known linkages have ranges of motion that require elements of the linkages (e.g., link bars) to extend past the surface of the wing, which can add drag or other undesired properties to the aerodynamics of the wing. The linkages 300 disclosed herein (e.g., the first link bar 304, the second link bar 306, etc.) remain substantially within a surface (e.g., the outermost surface, the aerodynamic surface, etc.) of the wing 102 while moving between the raised position 318, the neutral position 314, and the lowered position 316. In these examples, not extending substantially beyond or remaining substantially within the surface of the wing 102 means that the linkage 300, first link bar 304 and second link bar 306 do not interfere or alter (e.g., does not cause unwanted changes to) the aerodynamics of wing 102 and/or the example control surface 310. As a result, unwanted changes to the aerodynamics of the wing 102 and/or the control surface 310 are reduced or eliminated. In some examples, for example, the second link bar 306 can be formed or configured so that it does not extend past the aerodynamic surface of the example wing 102 (e.g., an uppermost or outermost surface of the wing 102).

Actuation of the first link bar 304 in FIG. 4 controls the position of the control surface 310. The example linkage 300 is adapted to rotate approximately 30 degrees in the raised position 318 and approximately 40 degrees in the lowered position 316. However, in other examples, the example linkage 300 can be adapted to rotate at any other desired angle (e.g., between 15 degrees and 50 degrees in the raised position 318 and between 30 degrees and 75 degrees in the lowered position 316). Thus, the linkage 300 can be adapted to control the compound motion (e.g., rotation angle and translation distance) of the example trailing edge device 106 to best suit the needs of the example aircraft 100 and the example wing 102 (i.e., airfoil). As such, different amounts of angular rotation, translation, and/or arch-like motion can be. In some examples, the trailing edge device 106 can move between and/or to a number of positions (e.g., infinite) between the raised position 318 and the lowered position 316, thereby enabling the wing 102 and/or the aircraft 100 to optimize wing shape for performance in different environmental condition(s). Therefore, the trailing edge device 106 can be positioned at any rotational position relative to the wing 102 to adjust (e.g., improve) aerodynamic wing performance and/or aircraft performance (e.g., increase fuel efficiency, etc.).

Figure 5A:
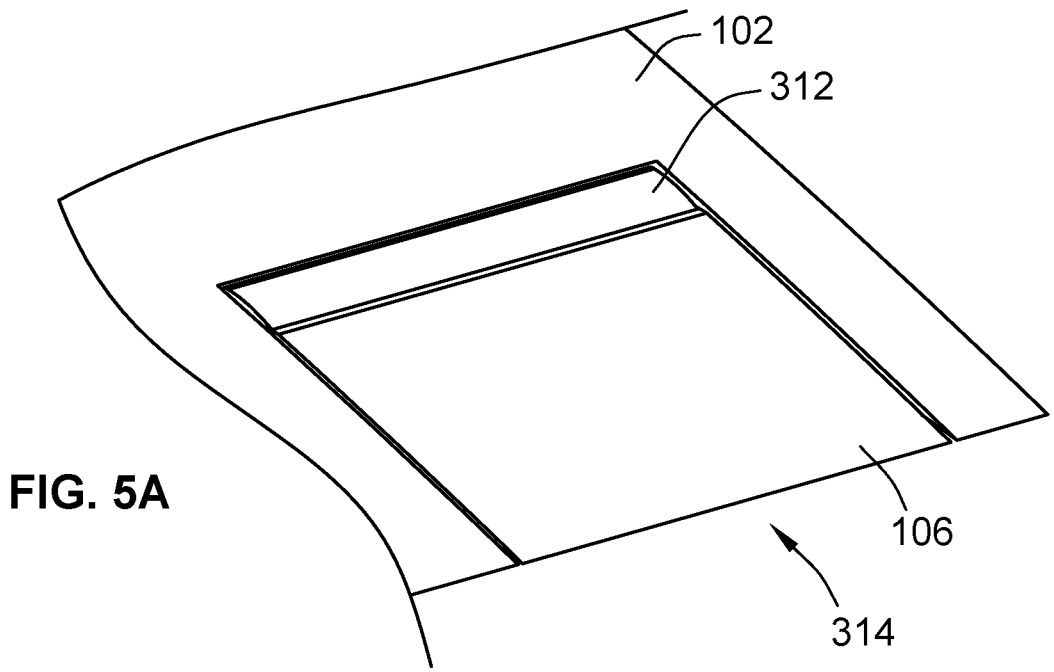
FIG. 5A illustrates the example trailing edge device of FIGS. 3A-3C mounted in the example aircraft wing of FIGS. 1 and 2.

FIG. 5A illustrates the example trailing edge device 106 of FIGS. 3A-3C mounted in the example aircraft wing 102 of FIGS. 1 and 2. The trailing edge device 106 of FIG. 5A is illustrated in the neutral position 314. The panel 312 is positioned adjacent a fore edge of the trailing edge device 106. For example, the panel 312 at least partially extends above, across or over (e.g., the fore edge of) the trailing edge device 106 at least when the trailing edge device 106 is in a neutral or a raised position (e.g., the neutral position 314, the raised position 318). In some examples, the example panel 312 rests on at least a portion of (e.g., the fore edge of) the trailing edge device 106 (e.g., when the trailing edge device 106 is in at least the neutral position 314 or the raised position 318). In other words, when the trailing edge device 106 is in the neutral position 314, the panel 312 covers, reduces or otherwise eliminates the gap 320. As such, the wing 102, the panel 312, and the trailing edge device 106 (e.g., along with the panel 312 covering the gap 320) form a continuous aerodynamic surface (e.g., an airfoil).

Figure 5B:
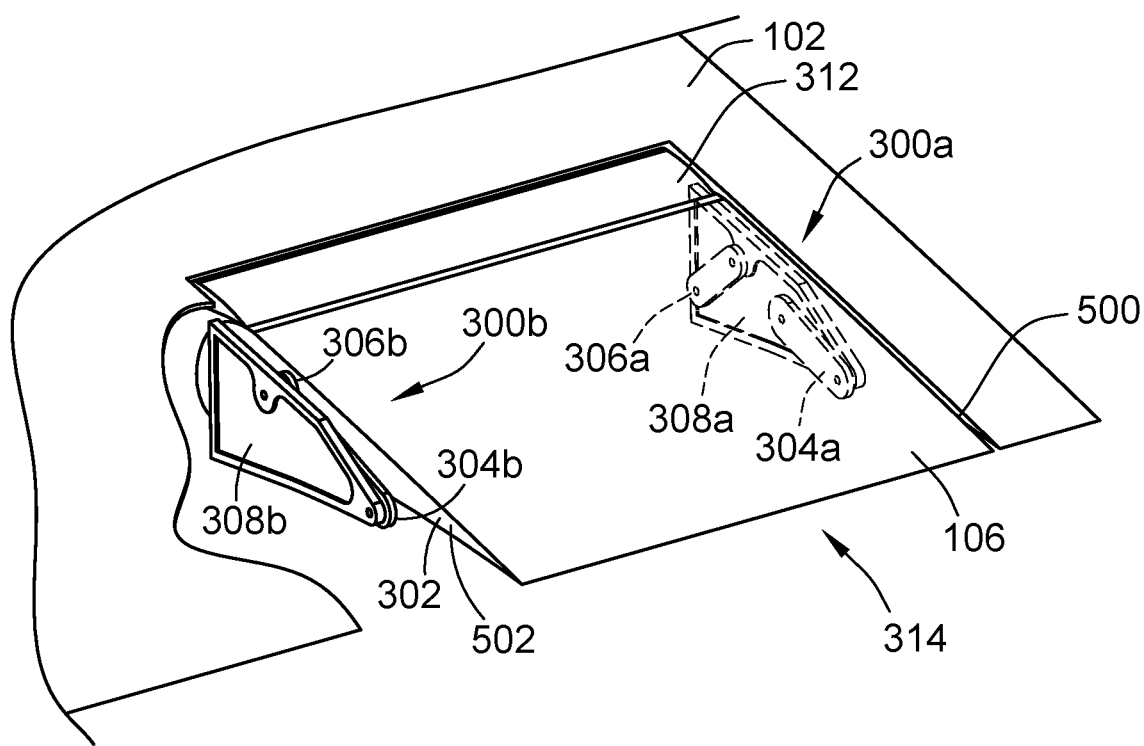
FIG. 5B illustrates example first and second mounting brackets and example first and second linkages of the example trailing edge device of FIGS. 3A-3C.

FIG. 5B illustrates example first and second mounting brackets 308a and 308b and example first and second linkages 300a and 300b of the example trailing edge device 106 of FIGS. 3A-3C. In FIG. 5B, parts similar or identical to those in FIGS. 3A-3C use the same reference number with the addition of a suffix (e.g., "a", "b", etc.) to distinguish between right and left side components. Thus, the linkages 300a and 300b correspond to right and left side component, respectively, which are similar or identical to the linkage 300 of FIGS. 3A-3C. Portions of the wing 102 in FIG. 5B have been removed for clarity.

The first linkage 300a of the illustrated example is coupled to the body 302 on an example first side surface 500 (e.g., close-out rib, a close-out panel, etc.) of the body 302 by rotationally coupling a first link bar 304a and a second link bar 306a to the first side surface 500. The second linkage 300b is coupled to the body 302 on an example second side surface 502 (e.g., close-out rib, a close-out panel, etc.) of the body 302 by rotationally coupling a third link bar 304b and a fourth link bar 306b to the second side surface 502. In some examples, the body 302 of the trailing edge device 106 is fully supported by the first and second linkage 300a and 300b when the first linkage 300a and the second linkage 300b is coupled to the first mounting bracket 308a and the second mounting bracket 308b, respectively. However, other example trailing edge devices can be fully or partially supported on the wing 102 by alternative couplings while the motion of the body 302 is controlled by one or more linkages. As shown in FIG. 5B, the example trailing edge device 106 is coupled to the wing 102 by rotatably coupling the first link bar 304a and the second link bar 306a to the first mounting bracket 308a, and further by coupling the third link bar 304b and the fourth link bar 306b to the second mounting bracket 308b. The first and second mounting brackets 308a and 308b of the illustrated example are mounting ribs extending from a cove of the wing 102, which removes the need for separate bracket components in the assembly process.

Figure 6A:
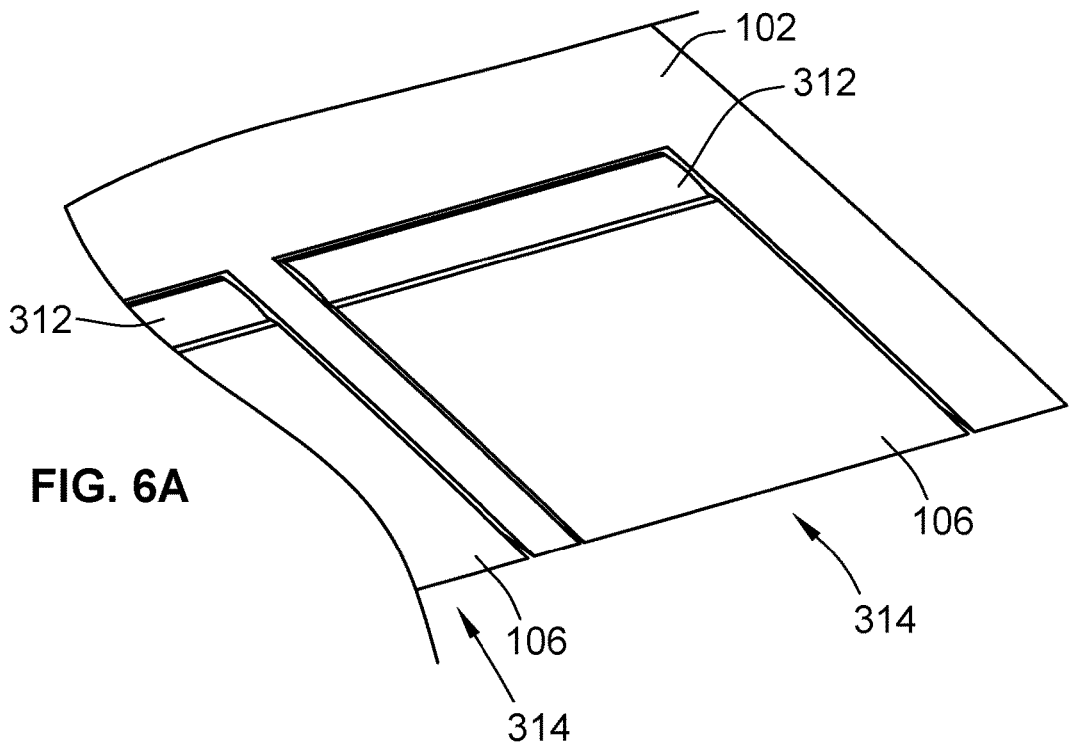
FIGS. 6A-6B illustrate an example arrangement of two of the example trailing edge devices of FIGS. 3A-3C, example first and second mounting brackets, and example first, second, and third linkages.
Figure 6B:
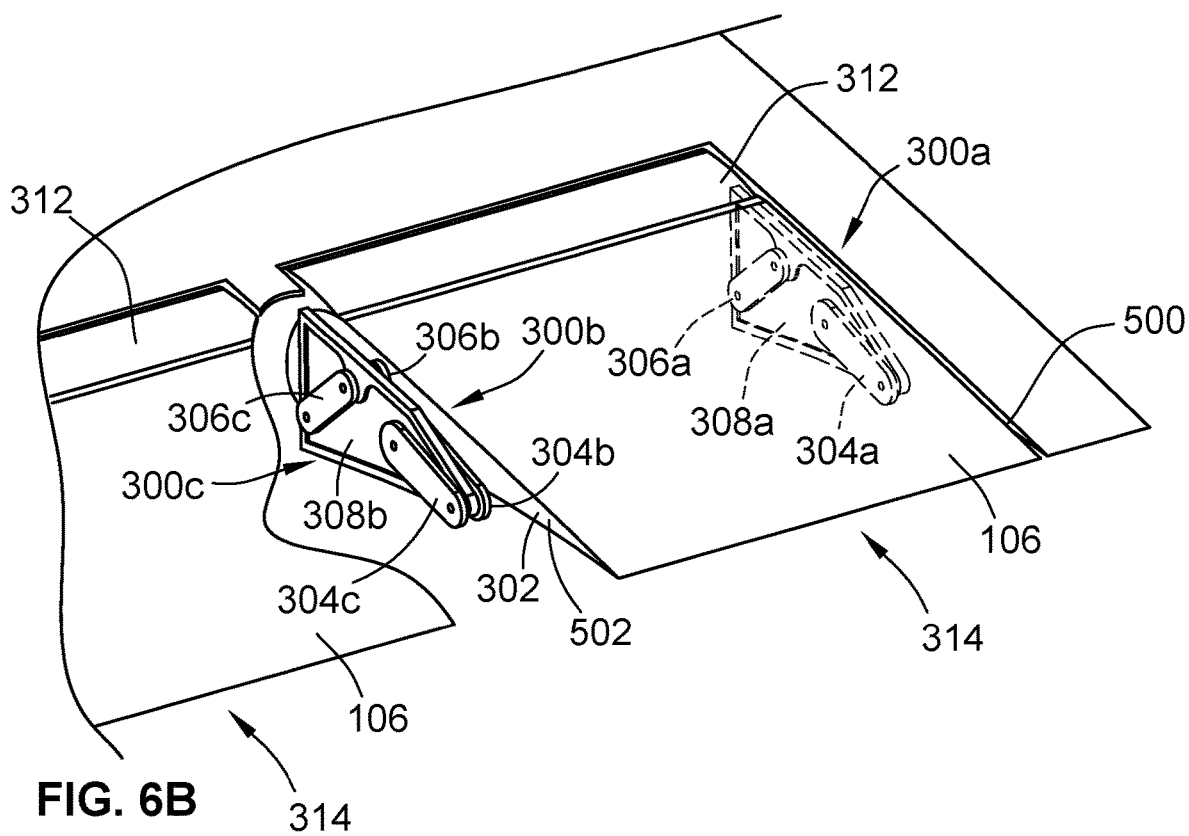

FIGS. 6A-6B illustrates an example arrangement of two of the example trailing edge devices 106 of FIGS. 3A-3C, the example first and second mounting brackets 308a and 308b, the example first and second linkages 300a and 300b, and an example third linkage 300c. The example trailing edge devices 106 are shown in the neutral position 314 and mounted in a similar fashion to the example trailing edge device 106 of FIGS. 5A-5B. In the illustrated example, adjacent ones of the trailing edge devices 106 share a coupling to a mounting bracket (e.g., the second mounting bracket 308b) positioned between the adjacent ones of the trailing edge devices 106. For instance, the trailing edge devices 106 of FIGS. 6A-6B are mounted to the wing 102 to share the second mounting bracket 308b as a common mounting bracket. In this example, the third link bar 304b and the fourth link bar 306b associated with a first one of the trailing edge devices 106 are mounted to a first side of the second mounting bracket 308b, and a fifth link bar 304c and a sixth link bar 306c of a second one of the trailing edge devices 106 adjacent the first one of the trailing edge devices 106 are mounted to a second side of the second mounting bracket 308b opposite the first side. Thus, the third link bar 304b, the fourth link bar 306b, the fifth link bar 304c and the sixth link bar 306c can be mounted on both sides of the second mounting bracket 308b using a common coupling element (e.g., a pin, stud, or fastener). The distance between the trailing edge devices 106 can vary depending on the geometry of the second mounting bracket 308b, the second linkage 300b, and a third linkage 300c between the trailing edge devices 106.

Figure 7:
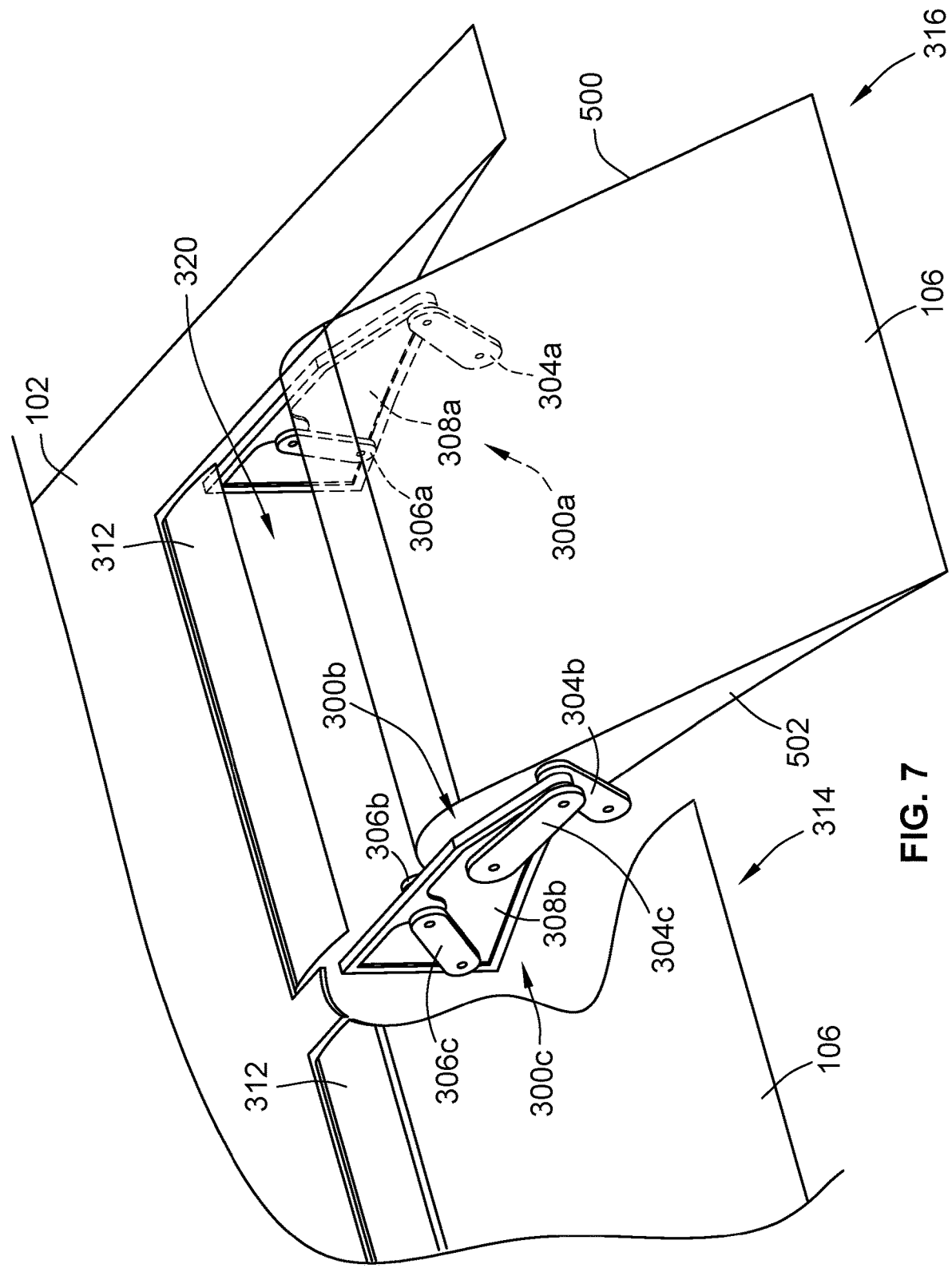
FIG. 7 illustrates the example trailing edge device of FIG. 6B in an example lowered position.

FIG. 7 illustrates the example trailing edge device 106 of FIG. 6B in the lowered position 316. The trailing edge devices 106 can be actuated independently or separately even when mounted to a shared example mounting bracket 308 as depicted in FIG. 7. Although the third link bar 304b, the fourth link bar 306b, the fifth link bar 304c and the sixth link bar 306c are mounted to a common mounting bracket 308b, the third link bar 304b and the fourth link bar 306b move independently from the fifth link bar 304c and the sixth link bar 306c. In other words, the first one of the trailing edge devices 106 having the second linkage 300b moves independently from the second one of the trailing edge devices 106 having the third linkage 300c. In some examples, any number of trailing edge devices 106 can be arranged across the wing 102 and each example trailing edge device 106 can be actuated to similar or different positions from the remaining trailing edge devices 106.

Figure 8:
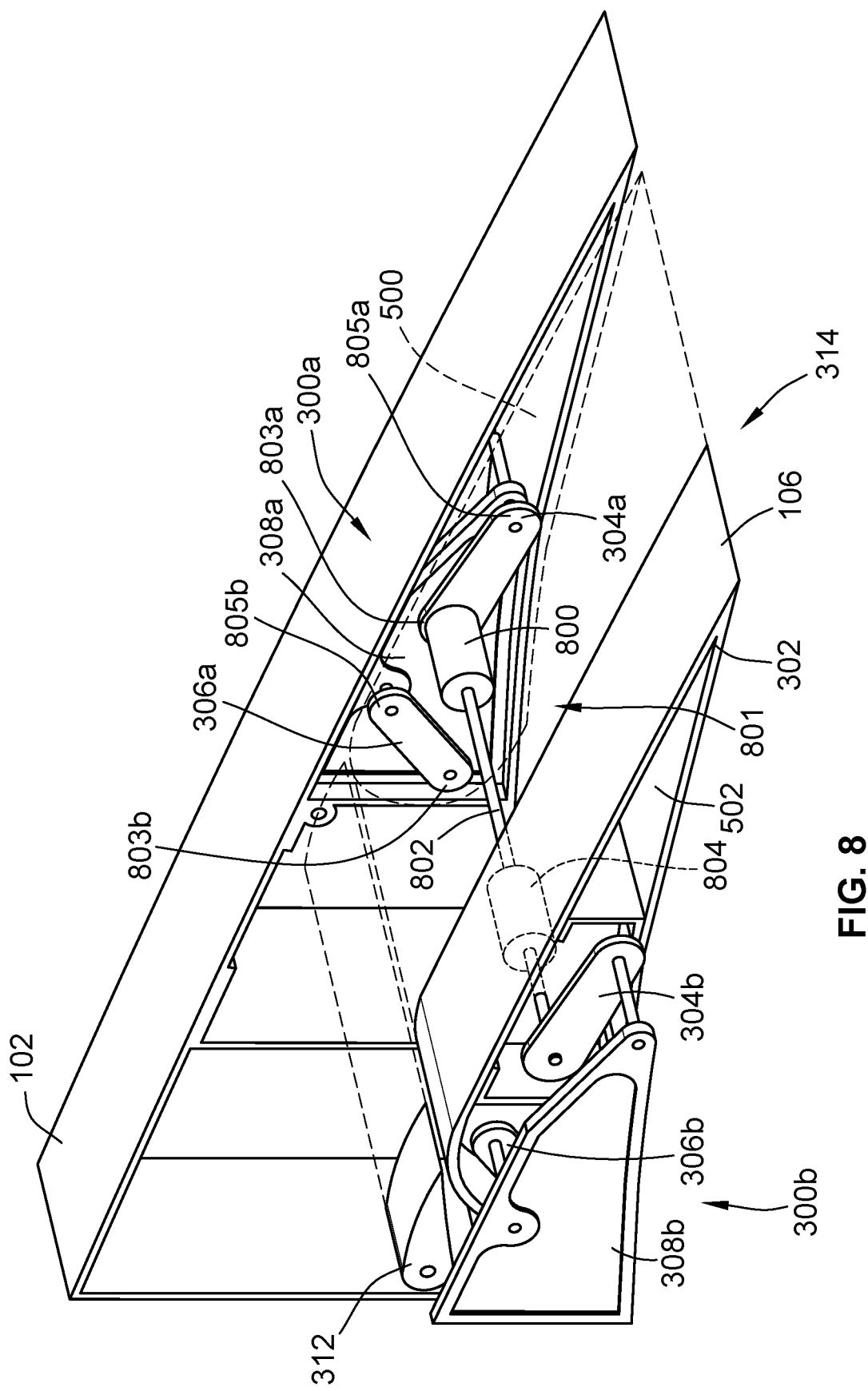
FIG. 8 illustrates the structure and mechanical components of the example trailing edge device of FIGS. 5A-5B in a neutral position.

FIG. 8 illustrates structural and mechanical components providing an actuation system or assembly of the example trailing edge device 106 of FIGS. 5A-5B. The example body 302, a portion of which has been removed as indicated by dashed lines, shows an example actuation system within a cavity 801 of the body 302 and/or the trailing edge device 106. The actuation system of the example trailing edge device 106 includes an example first rotary actuator 800 coupled to the example first link bar 304a (i.e., a crank link). For example, the first link bar 304a of the illustrated example has a first end 803a and a second end 805a spaced from the first end 803a. The first rotary actuator 800 of the illustrated example includes an output shaft coupled to the first end 803a of the first link bar 304a. The second end 805a of the first link bar 304a is coupled to the first mounting bracket 308a. For example, the first end 803a of the first link bar 304a is fixed to the output shaft of the first rotary actuator 800 and the second end 805a of the first link bar 304a is rotatably coupled to the first mounting bracket 308a via a bushing or other coupling to enable rotation of the second end 805a of the first link bar 304a relative to the first mounting bracket 308a. The first rotary actuator 800 of the illustrated example is directly coupled with the first link bar 304a. Alternately, in some examples, the first rotary actuator 800 can be coupled to the first link bar 304a using known torque couplings or transmissions (e.g., gears, chains, belts, sprockets, etc.). In some examples, the first rotary actuator 800 is located off axis to (e.g., a rotational axis of) the first link bar 304a and coupled to the first link bar 304a through a transmission (e.g., a gear, a gear train) and/or other means. The second link bar 306a includes a first end 803b and a second end 805b spaced from the first end 803b. The first end 803b of the second link bar 306a is coupled to the first side surface 500 of the trailing edge device 106 and the second end 805b of the second link bar 306a is coupled to the first mounting bracket 308a. For example, the first end 803b of the second link bar 306a is rotatably coupled to first side surface 500 of the trailing edge device 106 via bushing or other coupling to enable rotation of the first end 803b of the second link bar 306a relative to the first side surface 500 and the second end 805b of the second link bar 306a is rotatably coupled to the first mounting bracket 308a via a bushing or other coupling to enable rotation of the second end 805b of the second link bar 306a relative to the first mounting bracket 308a.

The third link bar 304b and the fourth link bar 306b are coupled to the second mounting bracket 308b and the second side surface 502 of the trailing edge device 106 in a manner substantially similar and/or identical to the first link bar 304a and the second link bar 306a, respectively. In some examples, the first rotary actuator 800 can be further coupled to the third link bar 304b using an example torque shaft 802. The torque shaft 802 ensures the first linkage 300a and the second linkage 300b move synchronously. The first rotary actuator 800 can alternatively be coupled to the third link bar 304b with or without the torque shaft 802. The first rotary actuator 800 in this example is powered by electricity, but in other examples the first rotary actuator 800 can be powered by alternative sources (e.g., hydraulic, pneumatic, etc.). The example trailing edge device 106, as shown in FIG. 8, includes the first rotary actuator 800 coupled to the first link bar 304a and an example second rotary actuator 804 coupled to the third link bar 304b. The rotary actuators 800 and 804 increase the effective torque available to rotate the trailing edge device 106 or, alternatively, allow smaller rotary actuators 800 and 804 with lower power requirements to move the trailing edge device 106. In some examples, more than two rotary actuators are provided (e.g., three rotary actuators, four rotary actuators, etc.) operatively coupled via a transmission. In some examples, only one rotary actuator is provided.

Figure 9:
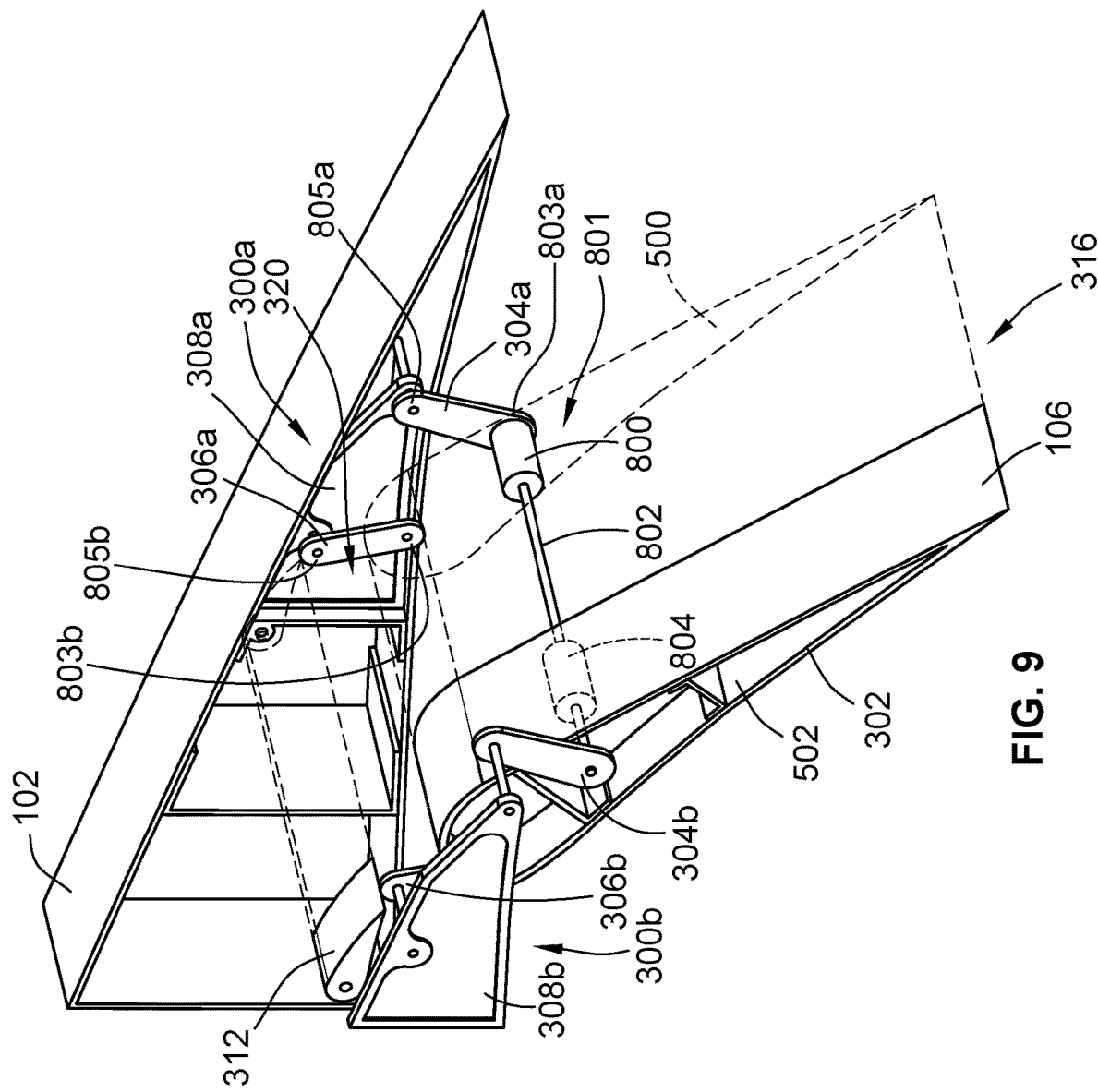
FIG. 9 illustrates the structure and mechanical components of the example trailing edge device of FIG. 8 in a lowered position.

FIG. 9 illustrates the structure and mechanical components of the example trailing edge device 106 of FIG. 8 in the lowered position 316. The actuator system, being contained in the cavity of the trailing edge device 106 and/or the body 302, moves with the body 302 as the body moves between the neutral position 314, the lowered position 316 and the raised position 318. Additionally, the lowered position 316 (i.e., a high-lift position) of the trailing edge device 106 moves the body 302 further aft of the panel 312. The panel 312 contacts the second link bar 306a and the fourth link bar 306b as the body 302 is no longer close enough to be contacted due to the gap 320.

Figure 10:
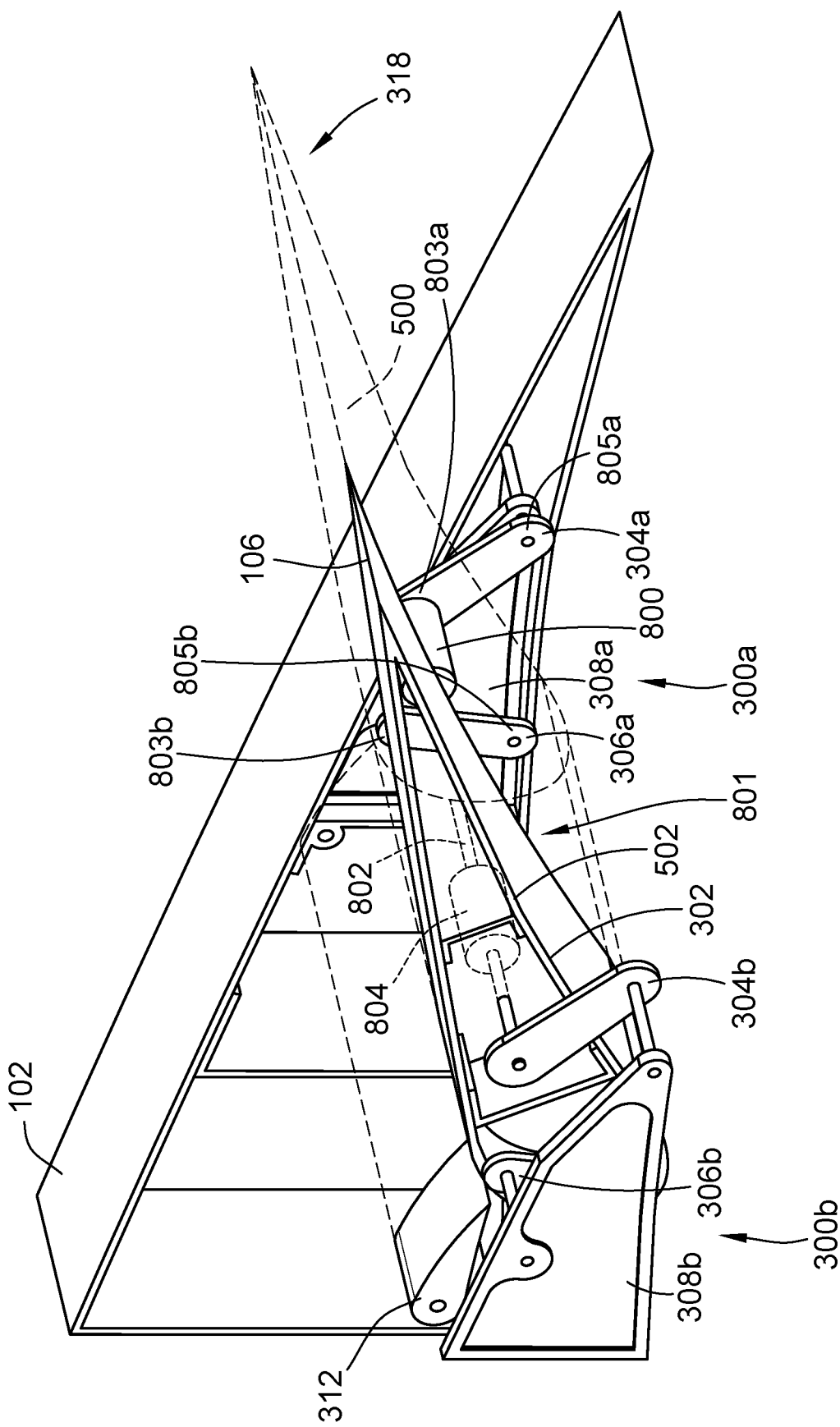
FIG. 10 illustrates the structure and mechanical components of the example trailing edge device of FIG. 8 in a raised position.

FIG. 10 illustrates the structure and mechanical components of the example trailing edge device 106 of FIG. 8 in the raised position 318. In this example, the first link bar 304a has been actuated by the first rotary actuator 800 so that the body 302 is in the raised position 318. In some examples this raised position causes a rolling movement in the example aircraft 100 similar to an aileron. In some examples, multiple trailing edge devices can be operated together or oppositely to form a spoiler position or a speed brake position.

Figure 11:
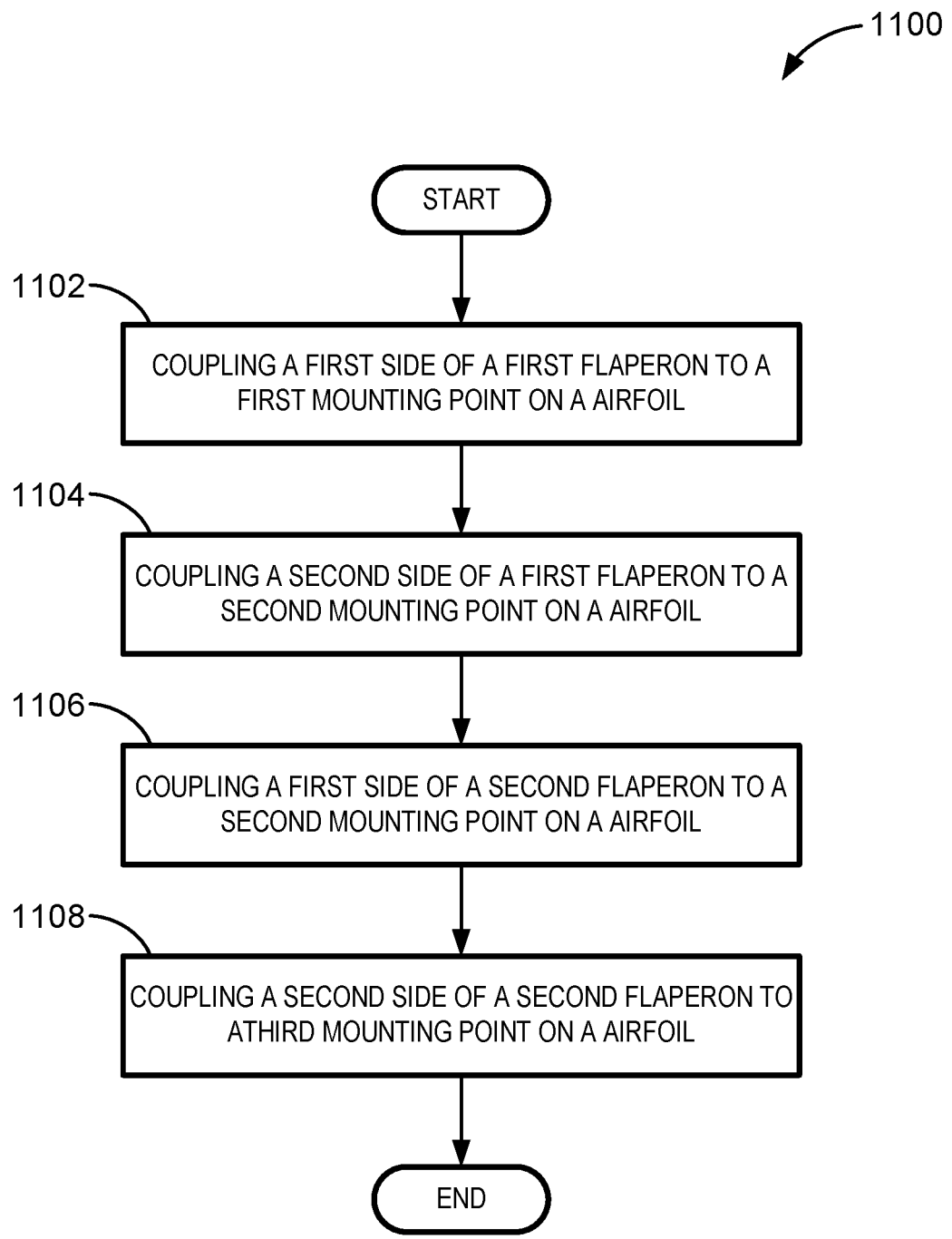
FIG. 11 is a flowchart representative of an example method for installing a trailing edge system of an aircraft.

FIG. 11 is a flowchart representative of an example method 1100 for assembling example trailing edge devices 106 described herein to an aircraft. The method begins with coupling a first side (e.g., the first side surface 500 (e.g., a close-out rib)) of a first trailing edge device (e.g., the trailing edge device 106) to a first mounting point (e.g., the first mounting bracket 308a) of an airfoil (e.g., the wing 102) (block 1102). In some examples, the first side surface 500 of the trailing edge device 106 is coupled to the first mounting bracket 308a by rotatably coupling the first link bar 304a (e.g., the second end 805a of the first link bar 304a) to the first mounting bracket 308a at a first pivot mounting point, and the second link bar 306a (e.g., the second end 805b of the second link bar 306a) of the first linkage 300a to the first mounting bracket 308a at a second pivot mounting point, where the first mounting pivot point is spaced from the second mounting pivot point. The link bars can be coupled with any suitable known rotatable couplings including bearings, bushings, or pins.

The method 1100 continues with coupling a second side (e.g., the second side surface 502) of the first trailing edge device (e.g., the trailing edge device 106) to a second mounting point (e.g., the second mounting bracket 308b) on the airfoil (e.g., the wing 102) (block 1104). In some examples, block 1104 is performed identically to block 1102 using the third link bar 304b, the fourth link bar 306b, and the second mounting bracket 308b. The first trailing edge device 106 has a rotary actuator (e.g., the first rotary actuator 800) housed within it, so no additional mechanical elements are coupled to the airfoil to enable the first trailing edge device to function (e.g., rotate relative to the wing 102). At block 1106, a first side of a second trailing edge device (e.g., the trailing edge device 106) is coupled to the second mounting point (e.g., the second mounting bracket 308b) on the airfoil (e.g., the wing 102). In some examples, the second mounting bracket 308b has mounting hardware (e.g., pins) that extend equally from both sides of the second mounting bracket 308b. Thus, the first and second trailing edge devices share at least one common coupling element (e.g., the pin)

which simplifies and increases the efficiency of the assembly process. The method 1100 ends with coupling a second side of the second trailing edge device to a third mounting point of the airfoil (block 1108). The method 1100 is modular in nature, and thus can be repeated for any number of adjacent ailerons beyond the first and second aileron as needed. Thus, in some examples, an example trailing edge can be shipped from a manufacturer as a kit or module having the body 302 that includes the first rotary actuator 800 within the body 302 and the first link bar 304*a* and the second link bar 306*a* adjacent the side surfaces 500, 502 of the trailing edge device 106.

The following paragraphs provide various examples of the multi-functional trailing edge apparatus and methods for aircraft disclosed herein:

Example 1 is a wing of an aircraft comprising an aft edge supporting a trailing edge device. The trailing edge device has a control surface and a side surface. A linkage is rotatably coupled to the side surface and the aft edge, and a rotary actuator is operatively coupled to the linkage to move the control surface.

Example 2 includes the wing of example 1, where the rotary actuator is disposed within the trailing edge device.

Example 3 includes the wing of example 1, where the control surface can move between a spoiler position, a neutral position, and a high-lift position.

Example 4 includes the wing of example 3, further including a panel adjacent the trailing edge device. The panel is rotatably coupled to the wing and rotationally biased toward the trailing edge device.

Example 5 includes the wing of example 3, further including a plurality of trailing edge devices, including the trailing edge device, arranged along the aft edge of the wing.

Example 6 includes the wing of example 5, where the linkage of the trailing edge devices remains substantially within a surface of the wing while moving between the spoiler position, the neutral position, and the high-lift position.

Example 7 is a trailing edge device of an aircraft including a body having a first side surface. The trailing edge device has a first plurality of link bars rotatably coupled to the first side surface. A first actuator is operatively coupled to a first link bar of the first plurality of link bars, and the first actuator rotates the first link bar relative to the body.

Example 8 includes the trailing edge device of example 7, where the body includes a second side surface. Example 8 further comprises a second plurality of link bars rotatably coupled to the second side surface.

Example 9 includes the trailing edge device of example 8, further including a second actuator operatively coupled to a second link bar of the second plurality of link bars to rotate the second link bar.

Example 10 includes the trailing edge device of example 8, further including a torque shaft coupled to the first actuator. The torque shaft is further coupled to a second link bar of the second plurality of link bars to rotate the second link bar relative to the body.

Example 11 includes the trailing edge device of example 7, where the first actuator is disposed within the body.

Example 12 includes the trailing edge device of example 7, where the first plurality of link bars is rotatably coupled to an airfoil of the aircraft to rotate the trailing edge device through a plurality of positions relative to the airfoil.

Example 13 includes the trailing edge device of example 12, where the plurality of positions includes a raised position, a neutral position, and a lowered position.

Example 14 includes the trailing edge device of example 13, where the trailing edge device has a compound motion that translates the trailing edge device to form a gap between the trailing edge device and the airfoil as the trailing edge device moves to the lowered position.

Example 15 includes the trailing edge device of example 13, further including a panel rotatably coupled to the airfoil and contacting the body of the trailing edge device.

Example 16 includes the trailing edge device of example 15, where the panel contacts the first plurality of link bars as the trailing edge device moves to the lowered position.

Example 17 includes the trailing edge device of example 15, where the panel is rotationally biased to contact the body of the trailing edge device.

Example 18 is a method for assembling a trailing edge system including coupling a first side of a first trailing edge device to a first mounting point on an airfoil. The first trailing edge device includes a plurality of linkage members rotatably coupled to the first side of the first trailing edge device, a rotational actuator inside the first trailing edge device, the rotational actuator coupled to a first linkage member of the plurality of linkage members, and a second plurality of linkage members rotatably coupled to a second side of the first trailing edge device. The method of example 18 also includes coupling the second side of the first trailing edge device to a second mounting point on the airfoil.

Example 19 includes the method of example 18, where the first mounting point and the second mounting point are brackets extending from the airfoil.

Example 20 includes the method of example 19, further including coupling a second trailing edge device to the second mounting point such that the first trailing edge device and the second trailing edge device share at least one common coupling element and form a continuous control surface.

The following claims are hereby incorporated into this Detailed Description by this reference. Although certain example systems, apparatus, articles of manufacture, and methods have been disclosed herein, the scope of coverage of this patent is not limited thereto. On the contrary, this patent covers all systems, apparatus, articles of manufacture, and methods fairly falling within the scope of the claims of this patent.

What is claimed is:

1. A wing of an aircraft comprising:
    an aft edge including a mounting bracket;
    a trailing edge device, the trailing edge device having:
        a control surface;
        a side surface;
        a linkage rotatably coupled to the side surface and the aft edge, the linkage including:
            a first link pivotally coupled to the mounting bracket; and
            a second link pivotally coupled to the side surface of the trailing edge device and the mounting bracket, wherein the mounting bracket, the first link, the second link and the side surface provide a four-bar linkage system to move the trailing edge device relative to the wing; and
    a rotary actuator operatively coupled to the first link to move the control surface relative to the wing.

2. The wing as recited in claim 1, wherein the rotary actuator is disposed within the trailing edge device.

3. The wing as recited in claim 1, wherein the control surface is to move between a spoiler position, a neutral position, and a high-lift position.

4. The wing as recited in claim 3, further including a panel positioned adjacent the trailing edge device, the panel rotatably coupled to the wing and rotationally biased toward the trailing edge device.

5. The wing as recited in claim 3, further including a plurality of trailing edge devices, including the trailing edge device, arranged along the aft edge of the wing.

6. The wing as recited in claim 3, wherein at least the mounting bracket and the second link of the linkage remains substantially within a surface of the wing when the trailing edge device moves between the spoiler position, the neutral position, and the high-lift position.

7. A trailing edge device of an aircraft comprising:
a body having a first side surface and a second side surface opposite the first side surface defining a cavity therebetween;
a first linkage assembly coupled to the first side surface; and
a first actuator positioned within the cavity of the trailing edge device, the first actuator operatively coupled to the first linkage assembly, the first actuator to cause the trailing edge device to rotate through a plurality of positions relative to an airfoil of the aircraft via the first linkage assembly.

8. The trailing edge device as recited in claim 7, further including a second linkage assembly coupled to the second side surface of the trailing edge device.

9. The trailing edge device as recited in claim 8, further including a second actuator operatively coupled to the second linkage assembly, the second actuator to rotate the second linkage assembly.

10. The trailing edge device as recited in claim 8, further including a torque shaft coupled to the first actuator and coupled to the second linkage assembly.

11. The trailing edge device as recited in claim 7, wherein the first linkage assembly is rotatably coupled to the airfoil of the aircraft.

12. The trailing edge device as recited in claim 7, wherein the plurality of positions includes a raised position, a neutral position, and a lowered position.

13. The trailing edge device as recited in claim 12, wherein the trailing edge device has a compound motion that translates the trailing edge device to form a gap between the trailing edge device and the airfoil when the trailing edge device is in the lowered position.

14. The trailing edge device as recited in claim 12, further including a panel rotatably coupled to the airfoil.

15. The trailing edge device as recited in claim 14, wherein the panel contacts at least a portion of the first linkage assembly when the trailing edge device is in the lowered position.

16. The trailing edge device as recited in claim 14, wherein the panel is rotationally biased toward the trailing edge device.

17. A method for assembling a trailing edge system of an aircraft comprising:
coupling a first side of a first trailing edge device to a first mounting point on an airfoil, the coupling of the first side of the first trailing edge device including pivotally coupling a plurality of first linkage members of the first side of the first trailing edge device and the first mounting point, wherein the trailing edge system includes a rotational actuator positioned inside a cavity of the first trailing edge device and coupled to a first linkage member of the plurality of first linkage members; and
coupling a second side of the first trailing edge device to a second mounting point on the airfoil, the coupling of the second side of the first trailing edge device including pivotally coupling a plurality of second linkage members of the second side of the first trailing edge device and the second mounting point, the rotational actuator coupled to a second linkage member of the plurality of second linkage members.

18. The method for assembling the trailing edge system as recited in claim 17, wherein the first mounting point and the second mounting point are brackets extending from the airfoil.

19. The method for assembling the trailing edge system as recited in claim 18, further including coupling a second trailing edge device to the second mounting point such that the first trailing edge device and the second trailing edge device share at least one common coupling element and form a continuous control surface.

20. The wing of claim 1, wherein the first link has a first end and a second end opposite the first end, the first end of the first link pivotally coupled to the mounting bracket, wherein the second link has a third end and a fourth end opposite the third end, the third end of the second link pivotally coupled to the mounting bracket and the fourth end pivotally coupled to the trailing edge device, and wherein the mounting bracket is fixed relative to at least one of the wing or the trailing edge device.

21. The trailing edge device of claim 7, wherein the first linkage assembly includes a mounting bracket, a first bar and a second bar, wherein the mounting bracket is to be fixed relative to a wing of the aircraft.

22. The trailing edge device of claim 21, wherein the first linkage assembly and the body of the trailing edge device provide a four-bar linkage system to move the trailing edge device between the plurality of positions.

23. The trailing edge device of claim 22, wherein the mounting bracket is fixed to the airfoil and is a ground link or stationary link of the four-bar linkage system, the second bar is a rocker link of the four-bar linkage system, the body of the trailing edge device is a coupler link of the four-bar linkage system, and the first bar is a crank link of the four-bar linkage system.

\* \* \* \* \*